United States Patent
Stock

[15] 3,656,316
[45] Apr. 18, 1972

[54] CREAM COCKTAIL DISPENSER

[72] Inventor: Arnold H. Stock, Newton, Wis. 53063
[22] Filed: July 10, 1970
[21] Appl. No.: 53,816

[52] U.S. Cl. .................................62/306, 62/70, 62/392, 99/136
[51] Int. Cl. .......................................................F25c 7/10
[58] Field of Search ............62/342, 306, 69, 70, 392, 202; 165/65; 236/68; 99/136, 192

[56] References Cited

UNITED STATES PATENTS

| | | | |
|---|---|---|---|
| 3,402,562 | 9/1968 | Menzel | 62/342 X |
| 2,737,024 | 3/1956 | Swenson | 62/348 X |
| 3,279,205 | 10/1966 | Stoelting | 62/135 |
| 2,930,203 | 3/1960 | Koch | 62/135 |
| 3,045,441 | 7/1962 | Patch et al. | 62/135 X |
| 3,517,524 | 6/1970 | Fiedler | 62/135 X |
| 3,256,100 | 6/1966 | Bernstein et al. | 99/136 |

Primary Examiner—William E. Wayner
Attorney—Wheeler, House and Wheeler

[57] ABSTRACT

Disclosed herein is a method and apparatus for preparing and dispensing large quantities of frozen cream cocktails. The apparatus includes a remote mixing and storage chamber which contains a quantity of custard cream and liquor in preselected proportions. An agitator in the mixing chamber continuously mixes the ingredients which are conveyed by air pressure to a freezing chamber upon actuation of a dispensing valve. The cream-liquor mix is aerated by an air injector as the mix is conveyed to the freezing chamber.

4 Claims, 6 Drawing Figures

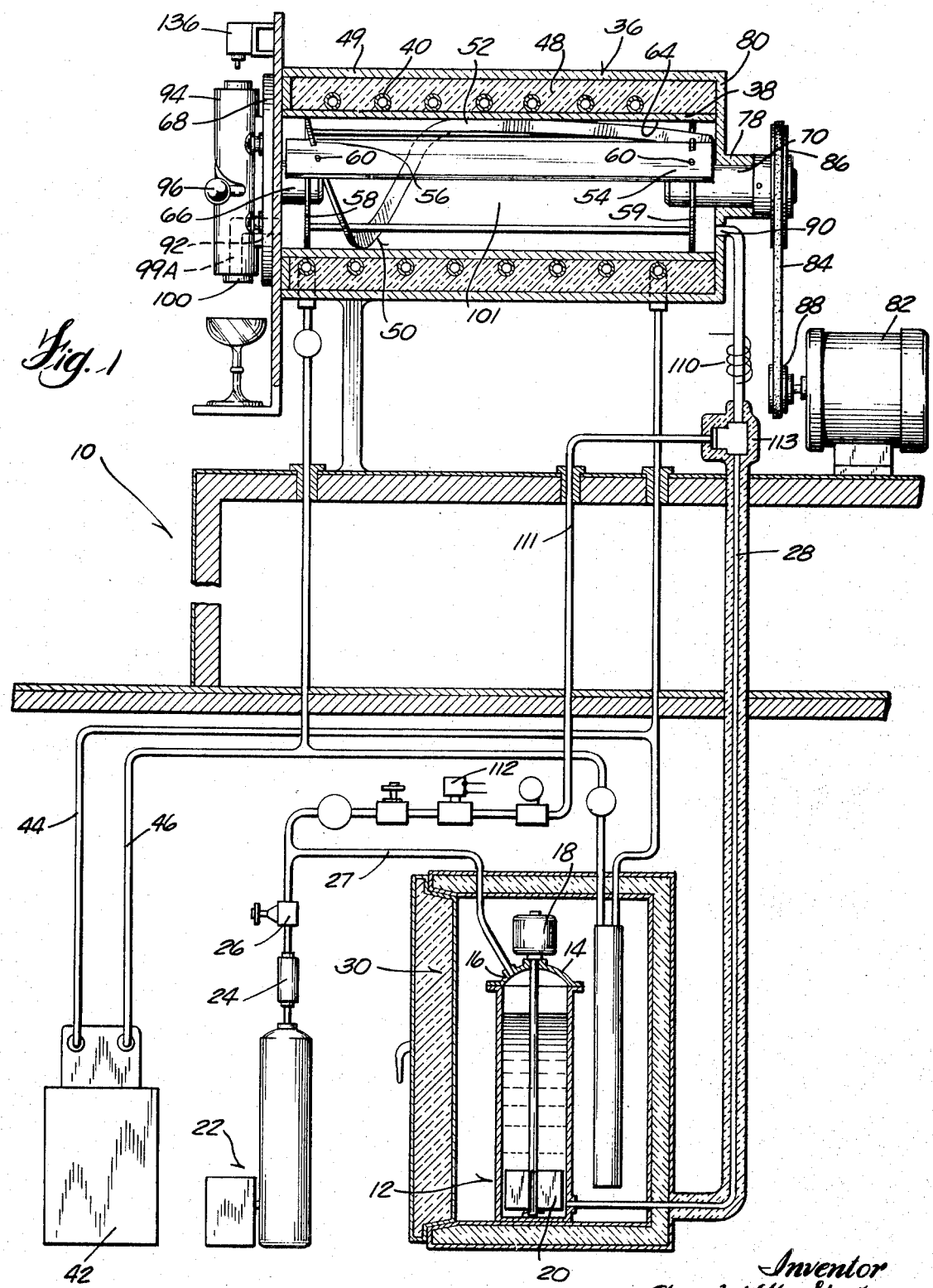

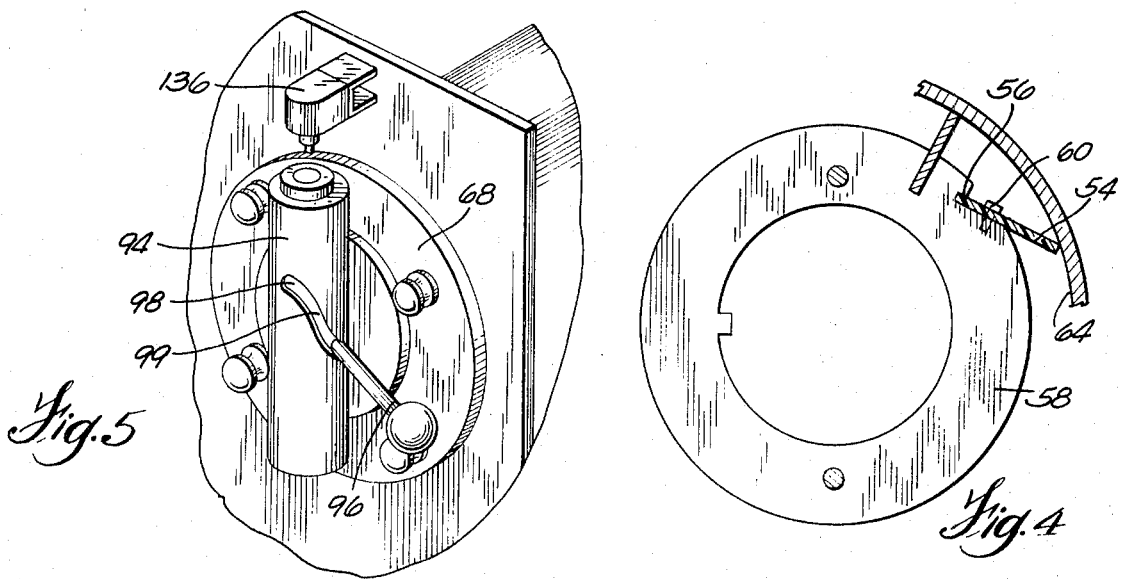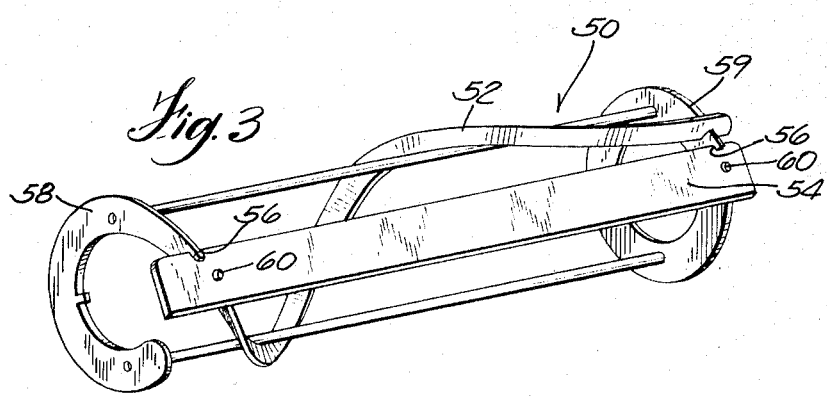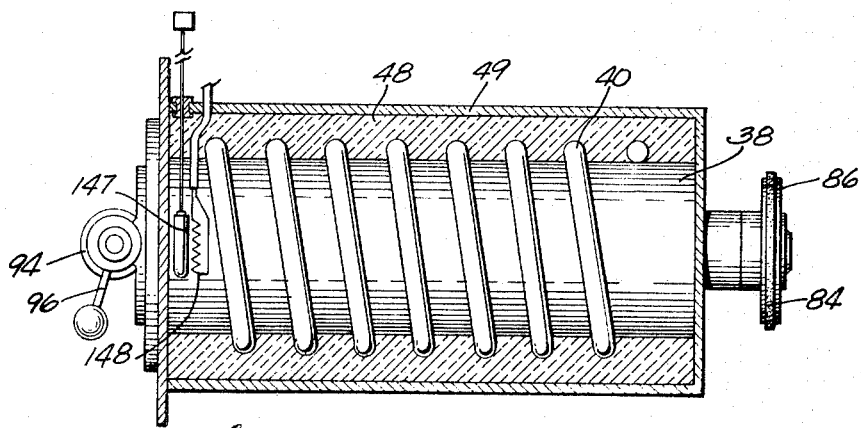

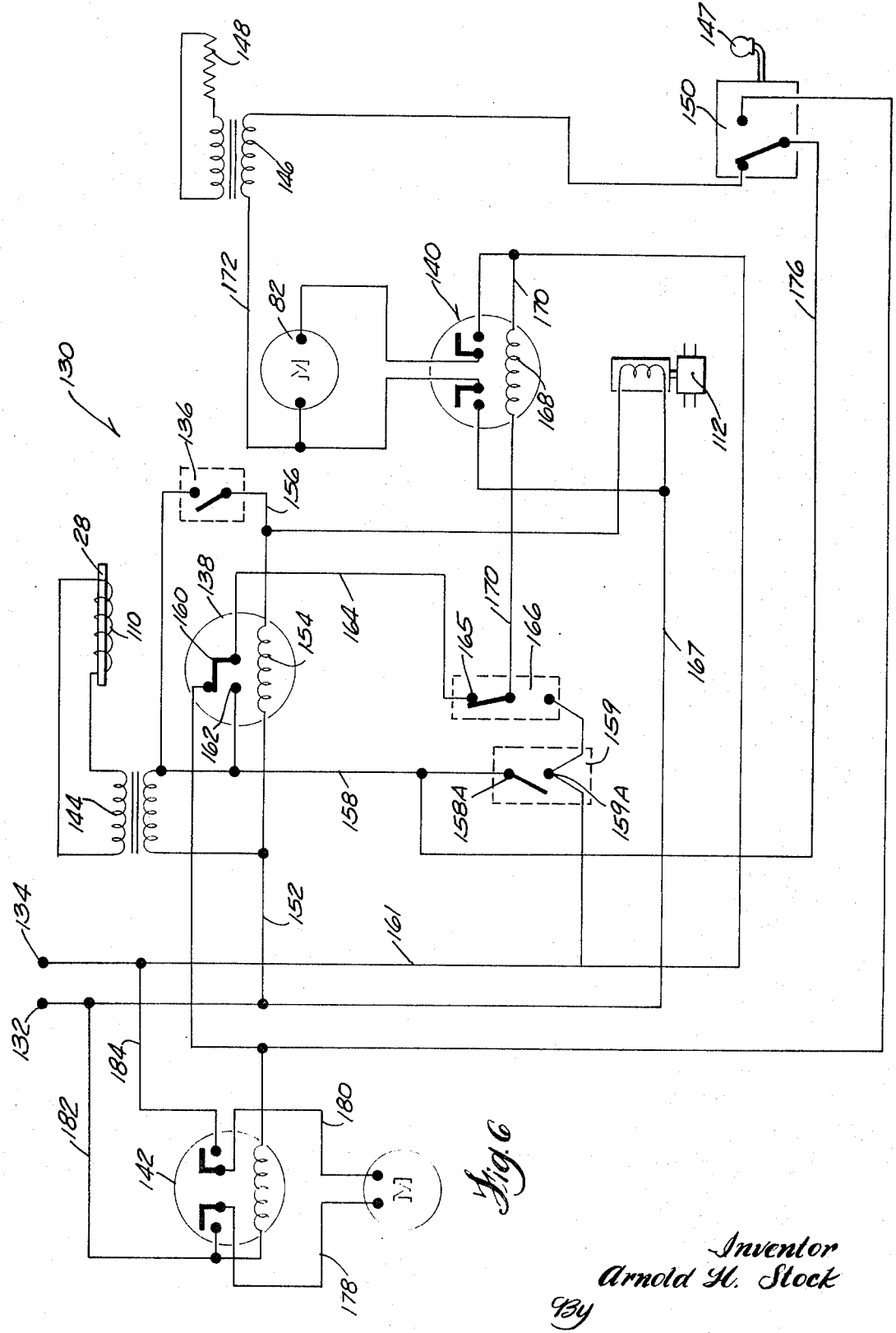

CREAM COCKTAIL DISPENSER

BACKGROUND OF THE INVENTION

The invention relates to the art of preparing frozen cream-liquor cocktails such as "Grasshoppers," "Pink Squirrels" and "Brandy Alexanders." Preparation of large quantities of these cocktails is time consuming because the ice cream and liquor must be mixed in a blender. Heretofore, cocktails of this type could not be prepared in advance and stored because of the difficulty in maintaining the desired consistency.

SUMMARY OF THE INVENTION

The invention provides a method and apparatus for preparing and dispensing a stored quantity of pre-mixed cream cocktails. The apparatus includes a refrigerated mixing chamber wherein custard-cream and liquor in pre-selected proportions are blended and stored at a location remote from a freezing chamber. The custard-cream liquor mix is conveyed by air pressure to the freezing chamber through an insulated conduit. An air injector communicating with the conduit aerates the cream-liquor mix to the desired consistency just prior to entry of the mix into the freezing chamber.

The freezing chamber contains an agitator or beater having a scraper blade and a dispensing outlet controlled by a dispensing valve. When the dispensing valve is moved to a dispensing position it energizes various relays to actuate the freezer compressor, the freezer beater and cause the injection of air into the conduit. As a quantity of prepared cocktail is dispensed from the freezing chamber, the air pressure in the mixing chamber causes a quantity of cream-liquor mix to move from the mixing chamber to fill the void in the freezing chamber to thus maintain a quantity of mix in the freezing chamber at all times.

It is an object of the invention to provide a method and apparatus for preparing and dispensing large quantities of frozen cocktails in which a custard-cream and liquor mix are stored and agitated in a remote refrigerated mixing chamber and conveyed by air pressure to a freezing chamber located at the dispensing station.

Further objects and advantages will become apparent from the following disclosure.

THE DRAWINGS

FIG. 1 is a side elevational view in fragmentary section of dispensing apparatus in accordance with the invention.

FIG. 2 is a fragmentary plan view in fragmentary section of the freezing chamber shown in FIG. 1.

FIG. 3 is a perspective view of the freezing chamber beater shown in FIG. 1.

FIG. 4 is an enlarged end view of the beater shown in FIG. 3.

FIG. 5 is a fragmentary perspective view of the freezing chamber and dispensing valve shown in FIGS. 1 and 2.

FIG. 6 is a schematic diagram of the electrical circuit.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structures.

In the drawings, FIG. 1 shows apparatus in accordance with the invention which is generally designated 10 and which includes a mixing and storage chamber 12 which has a removable cover 14 with an inlet 16. The cover 14 carries a motor 18 which continuously drives an agitator 20. The apparatus includes a pressurized air source in the form of an air compressor and tank 22 provided with a filter 24 and a valve 26. The compressed air tank is connected to the inlet 16 of the cover 14 by a conduit 27, and is used to convey a custard-cream cocktail mix from the mixing chamber as hereinafter described. The chamber 12 is maintained at a preselected temperature by a refrigeration compartment 30 which surrounds the chamber 12.

The apparatus of the invention also includes a freezing chamber 36 which includes a cylindrical stainless steel wall 38 surrounded by a helical freezing coil 40 (FIG. 1, FIG. 2) which is connected to a refrigeration unit 42 by conduits 44 and 46.

The freezing coil 40 is surrounded by insulation 48 located interiorly of a concentric outer wall 49. The freezing chamber includes a beater 50 (Fib. 1, 3, 4) having a flight 52 and a nylon scraper blade 54 which is anchored in generally tangential slots 56 in beater end portions 58 and 59 by screws 60. The scraper blade 54 engages the inside surface 64 (FIG. 1) of the freezing chamber 36 and keeps the cocktail mix from adhering to the surface 64. The forward end portion 58 is rotatably supported on a plastic hub 66 (FIG. 1 and 5) on the front cover 68 of the freezing chamber 36. The rear end portion 59 of the beater 50 is supported on and keyed to a stub shaft 70 which rotatably supported in a box 78 in a rear cover or wall 80. The shaft 70 is driven by a beater motor 82 and a belt 84 which is reeved around pulleys 86 and 88.

The conduit 28 is connected to an inlet aperture 90 in the rear cover 80. The front cover 68 is provided with an aperture 92 which communicates with a draw valve or dispensing valve 94. The valve 94 includes a handle or control member 96 which travels in a helical slot 98 (FIG. 5) and is connected to a valve spool 99. The spool 99 has a passage 99A (FIG. 1) which affords communication of the freezing chamber interior 101 with the dispensing outlet 100 in the lower end of the valve spool 99.

To prevent freezing of the conduit 28 adjacent the inlet 90, a heating coil 110 surrounds the conduit 28 and is energized as hereinafter described.

In accordance with the invention, means are provided to inject air into the cream liquor mix upon actuation of the dispensing valve 94. As disclosed, the means comprises a second conduit 111 which is connected to conduit 27 near the air source 22. The conduit 111 also communicates with conduit 28 adjacent the freezing chamber 36 through a "Y" coupling 113 so that the air is directed upstream toward the freezing chamber 136.

The injection of air into conduit 28 at coupling 113 is controlled by an air valve 112 which is connected to a circuit and actuated as subsequently described in detail.

In accordance with the invention, means are provided operable in response to actuation of the dispensing valve to open the air valve, energize the beater motor and actuate the refrigeration unit. As disclosed, the means includes an electrical circuit which is generally designated 130, which includes first and second input terminals 132 and 134. The circuit 130 includes a normally open micro-switch 136 which is located adjacent the dispensing valve and is closed when the control member 96 of the dispensing valve 94 is moved to dispense prepared cocktails. The circuit also includes a first relay 138, a second relay 140, a third relay 142, a heater transformer 144 for the heater coil 110 and a second heater transformer 146 for a heater coil 148.

The circuit includes a thermostat 150 which is connected as hereinafter described to operate the compressor 42 to supply refrigerant to the cooling coil 40 to maintain a selected temperature in the freezing chamber. Inasmuch as alcohol in the liquor substantially lowers the freezing temperature of the custard cream, the freezing chamber is desirably maintained at a temperature of 10° to 15° F., which is considerably cooler than the typical ice cream freezer which is operated at about 25° F. When the valve 94 is moved to a dispensing position and the micro-switch 136 is closed, the relay 138 is energized by current flowing from a lead 152 which is connected to the first input terminal 132 and relay coil 154 of relay 138. A lead 156 electrically connects the switch 136 to coil 154. The other terminal of switch 136 is connected to input terminal 134 by a lead 158 which is connected to a terminal 158A of a switch 159. The other terminal 159A of switch 159 is connected to input terminal 134 by a lead 161. When relay 138 is energized, the movable contact 160 engages terminal 162 to provide current flow from lead 158 through lead 164 which is connected to the contact 160 and to terminal 165 on a beater motor switch 166. The current goes from the beater switch 166 to the coil 168 of relay 140 through a lead 170. The coil 168 is connected to a lead 161 and the first terminal 132 by a lead 170.

When the relay 140 is energized, current is supplied to the beater motor 82 by electrical connection of the contacts in the relay 140. Energization of relay 140 also provides a current flow through lead 172 to the primary of transformer 146. When the transformer 146 is energized, voltage is supplied to the heater element 148 which causes a temperature sensing bulb 147 to close the contacts in the thermostat 150. The thermostat 150 causes a current flow through lead 176 to energize the coil in relay 142 and provide current to the refrigeration unit 42 through leads 178 and 180 which the relay 142 connects to leads 182 and 184 which are respectively connected to the input terminals 132 and 134.

Closing of the micro-switch 136 also energizes the electric air valve 112 through the lead 186, and energizes transformer 144 and heating coil 28.

All conduits, chambers and surfaces which contact the mix are desirably constructed of stainless steel to minimize corrosion. The beater 50 is easily disassembled from the freezing chamber to facilitate cleaning. Separate freezing chambers and mixing chambers are employed for each different cocktail, "Grasshopper," "Pink Squirrel," etc.

The switches 159 and 166 can be used to energize the beater motor 82 and the other components without utilizing the dispensing valve 94.

What is claimed is:

1. Apparatus for preparing and dispensing cream cocktails comprising a freezing chamber having an inlet and outlet and a beater rotatably supported within said chamber, a freezing coil surrounding said freezing chamber, a motor for driving said beater, refrigeration apparatus connected to said freezing coil, a mixing chamber for storing and mixing a custard cream-alcoholic mix-, a first conduit connecting said mixing chamber to said freezing chamber, a heating coil surrounding said conduit adjacent said freezing chamber, an air injector in said first conduit, a pressurized air source connected to said mixing chamber for aerating the mix, a second conduit connected to said air source and to said air injector, valve means in said second conduit, an electrical circuit including first, second and third relays, a dispensing valve on said freezing chamber, an electrical switch operable in response to movement of said dispensing valve to a dispensing position, circuit means electrically connecting said first, second and third relays so that upon opening of said dispensing valve said relays are actuated to cause said beater motor to be energized to dispense frozen mix and to energize said refrigeration apparatus to cool said freezing chamber and open said air valve to cause injection of air into said first conduit from said air source and energize said heating coil on said first conduit.

2. Apparatus according to claim 1 wherein said freezing chamber is maintained at a temperature between 10° and 15° F.

3. Apparatus according to claim 1 wherein said air injector in said first conduit is located intermediate said mixing chamber and said freezing chamber.

4. Apparatus according to claim 1 wherein said mixing chamber is at a temperature level above the freezing level of said mix.

* * * * *